United States Patent
Meier et al.

(10) Patent No.: US 7,559,728 B2
(45) Date of Patent: Jul. 14, 2009

(54) MILLING TOOL AND METHOD FOR MILLING RECESSES

(75) Inventors: Reinhold Meier, Dorfen (DE); Georg Moosrainer, Markt Indersdorf (DE); Wilfried Schuette, Oberhaching-Furth (DE)

(73) Assignee: MTU Aero Engines GmbH, Munich (DE)

( * ) Notice: Subject to any disclaimer, the term of this patent is extended or adjusted under 35 U.S.C. 154(b) by 164 days.

(21) Appl. No.: 10/578,702

(22) PCT Filed: Oct. 23, 2004

(86) PCT No.: PCT/DE2004/002367

§ 371 (c)(1),
(2), (4) Date: Dec. 14, 2006

(87) PCT Pub. No.: WO2005/046917

PCT Pub. Date: May 26, 2005

(65) Prior Publication Data

US 2007/0172319 A1   Jul. 26, 2007

(30) Foreign Application Priority Data

Nov. 11, 2003   (DE) ............................... 103 52 542

(51) Int. Cl.
*B23C 3/34* (2006.01)

(52) U.S. Cl. ............... 409/132; 409/143; 29/889.1; 29/557

(58) Field of Classification Search ............... 409/132, 409/131, 143; 29/889, 889.1, 889.23, 557–558
See application file for complete search history.

(56) References Cited

U.S. PATENT DOCUMENTS

| 2,284,636 | A | * | 6/1942 | Carlsen | 409/26 |
| 4,518,287 | A | * | 5/1985 | Bossler, Jr. | 409/26 |
| 5,911,548 | A | * | 6/1999 | Deiss et al. | 409/234 |
| 6,935,817 | B2 | * | 8/2005 | Sasu et al. | 29/889.23 |

FOREIGN PATENT DOCUMENTS

| DE | 2 300 736 | | 1/1973 |
| DE | 102005020033 A1 | * | 11/2006 |
| FR | 925 706 | | 9/1974 |
| FR | 2244593 A | * | 5/1975 |
| GB | 1 365 439 | | 9/1974 |
| GB | 2 276 575 | | 10/1994 |

* cited by examiner

*Primary Examiner*—Erica E Cadugan
(74) *Attorney, Agent, or Firm*—Davidson, Davidson & Kappel

(57) ABSTRACT

A milling tool which is used to mill recesses, in particular, circular-shaped grooves, in a workpiece is provided. The milling tool (10) is disposed on a disk-shaped or plate-shaped base body (14) and on at least one cutting body (15) arranged on the outer periphery of the base body (14). The cutting body or each cutting body (15) is inclined in relation to the disk-shaped base body or the plate-shaped base body (14).

6 Claims, 3 Drawing Sheets

US 7,559,728 B2

MILLING TOOL AND METHOD FOR MILLING RECESSES

FIELD OF THE INVENTION

The present invention relates to a milling tool for milling recesses. Moreover, the present invention relates to a method for milling recesses.

BACKGROUND

The present invention relates to the production of groove-like recesses via milling. According to the related art, end mills are used for milling circular groove-like recesses, the diameter of the end mill corresponding to the width of the groove-like recess to be produced. If narrow, groove-like recesses, i.e., grooves having a small width, are to be produced, the end mill must have a small diameter. In particular when milling narrow, circular grooves, there is the problem that the end mill is prone to wear due to its small diameter so that the end mill may only be operated with a low feed rate which eventually results in only a small amount of material being removed per time unit. Milling of narrow, circular grooves using end mills is therefore problematic overall.

SUMMARY OF THE INVENTION

An object of the present invention is to provide a novel milling tool for milling recesses, as well as a novel method for milling recesses.

According to the present invention, the milling tool has a disk-shaped or plate-shaped base body and at least one cutting body situated on the outer periphery of the base body, the cutting body or each cutting body being angled in relation to the disk-shaped or plate-shaped base body.

According to an advantageous refinement of the present invention, the cutting body or each cutting body is angled in relation to the disk-shaped or plate-shaped base body in such a way that an inner milling radius, defined by the cutting body or each cutting body, is greater than an outer circumferential radius of the disk-shaped or plate-shaped base body. In relation to a disk-shaped or plate-shaped surface defined by the base body, the cutting body or each cutting body is angled to one side, one outside of the cutting bodies and the disk-shaped or plate-shaped surface enclosing an angle greater than 0° and smaller than 90°, preferably an angle greater than 5° and smaller than 65°.

The method according to the present invention for milling recesses into a workpiece, in particular circular grooves, the workpiece being milled by a milling tool in such a way that an intended recess results is characterized in that a milling tool as described above is used.

BRIEF DESCRIPTION OF THE DRAWINGS

An exemplary embodiment of the present invention is explained in greater detail on the basis of the drawing without being limited thereto.

DETAILED DESRIPTION

Figure 2:
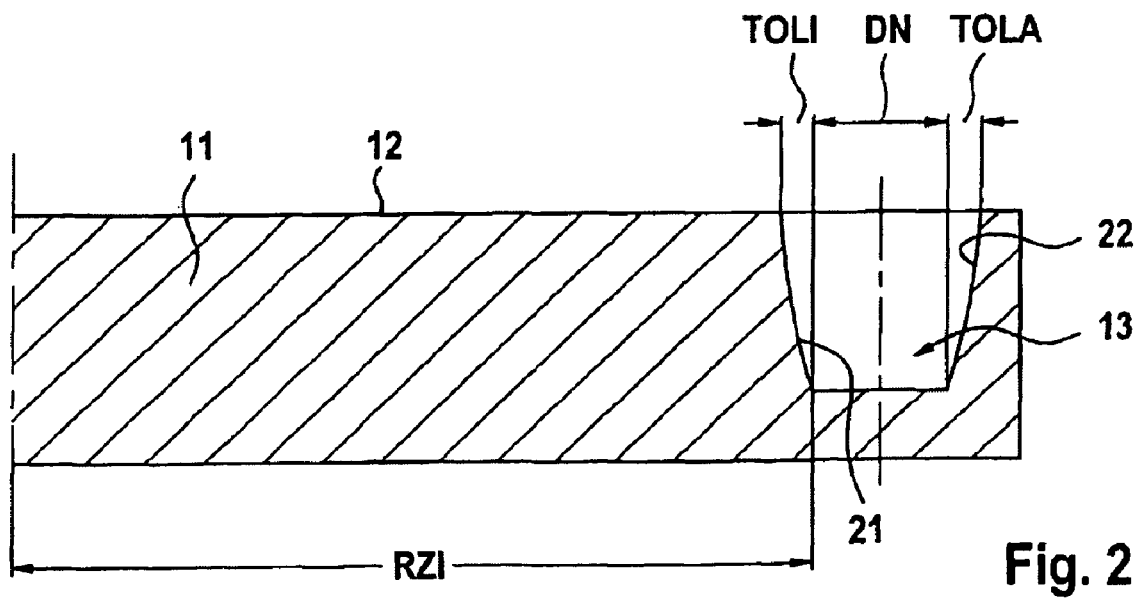
FIG. 2 shows a cutout from the workpiece to be milled of FIG. 1.
Figure 3:
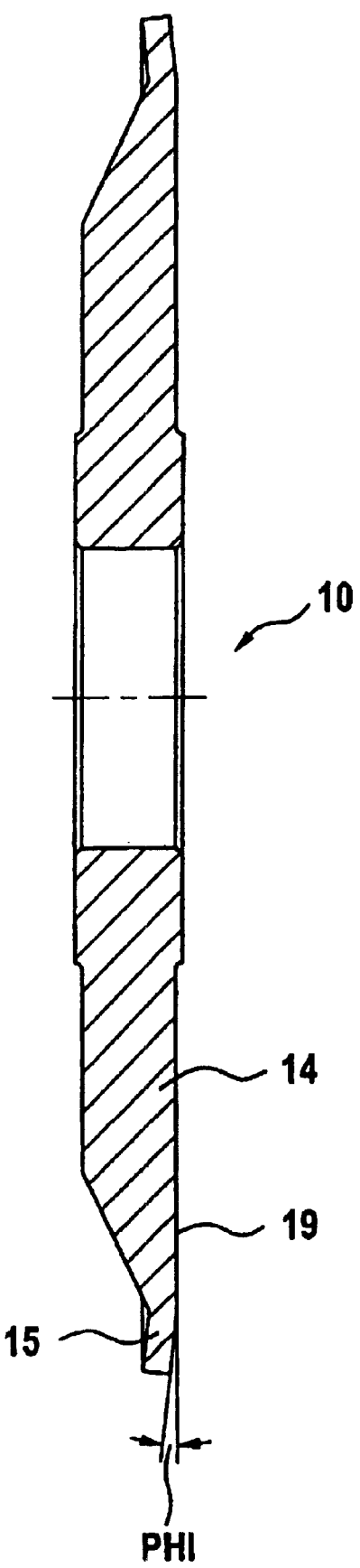
FIG. 3 shows a side view of a milling tool in the sense of the present invention.
Figure 4:
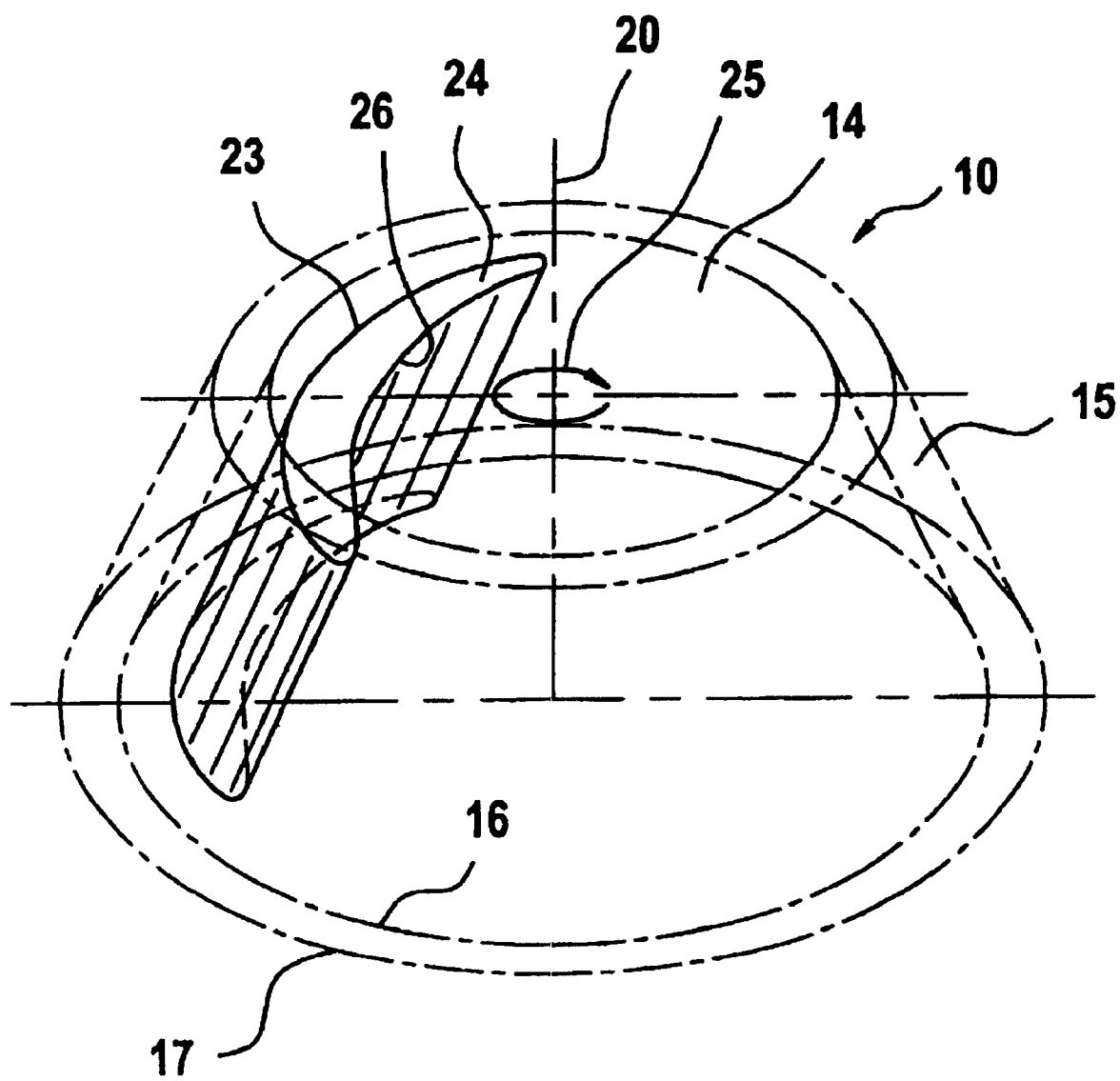
FIG. 4 shows another milling tool according to the present invention together with a workpiece to be milled, i.e., a blade profile to be milled, in a heavily schematized, perspective side view.

The present invention is described in greater detail in the following with reference to FIGS. 1 through 4, FIGS. 1 and 2 being schematic representations, FIG. 3 showing a preferred exemplary embodiment of a milling tool according to the present invention, and FIG. 4 visualizing a preferred use of the milling tool.

Figure 1:
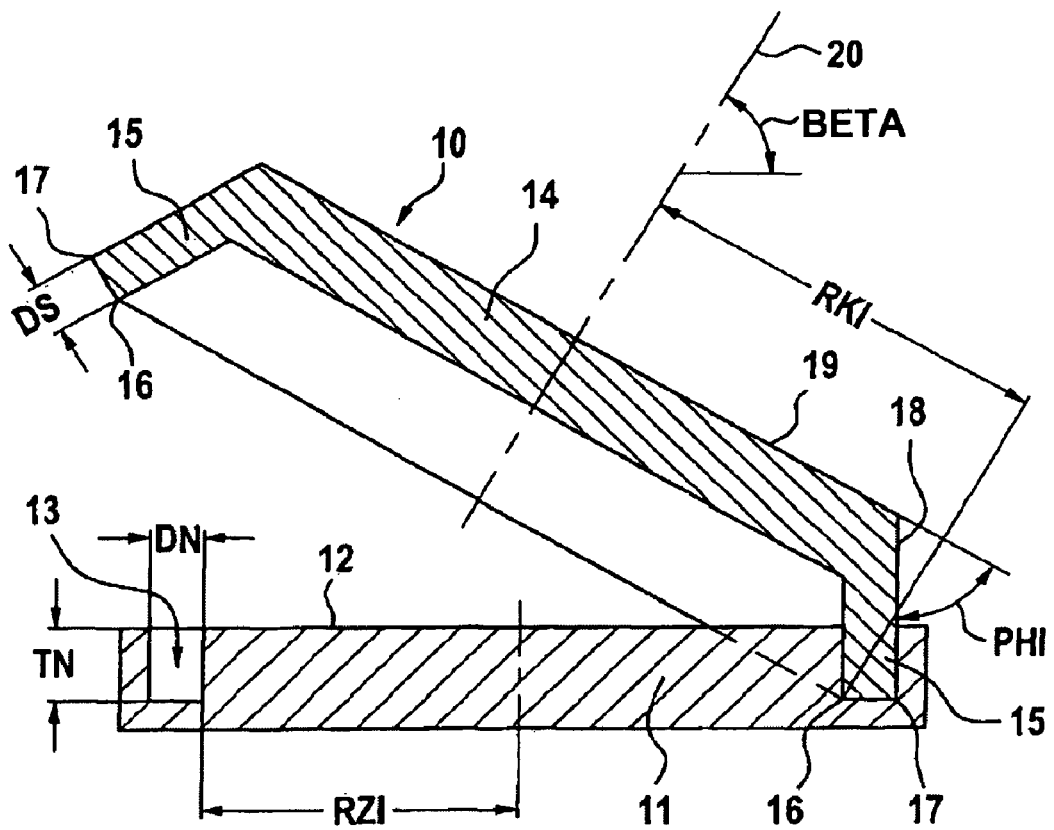
FIG. 1 shows a milling tool according to the present invention together with a workpiece to be milled in a heavily schematized cross section.

FIG. 1 shows the construction principle of a milling tool 10 according to the present invention together with a workpiece 11, a circular groove 13 being milled into a surface 12 of workpiece 11. Groove 13 to be milled has a width DN and a depth TN, FIG. 1 showing, as a further parameter of circular groove 13 to be produced, an inner radius RZI of circular groove 13 to be produced. An outer radius of circular groove 13 to be produced is ascertainable by adding inner radius RZI of groove 13 to be produced and thickness DN of the same.

Milling tool 10 according to the present invention represented in FIG. 1 is used for milling circular groove 13. Milling tool 10 has a disk-shaped or plate-shaped base body 14 as well as cutting bodies 15 angled in relation to base body 14. Cutting bodies 15 have a thickness DS which is adapted to width DN of groove 13 to be produced.

Cutting bodies 15 are angled in relation to disk-shaped or plate-shaped base body 14 in such a way that an inner milling radius RKI, defined by inner edges 16 of the cutting bodies, is greater than an outer circumferential radius of disk-shaped or plate-shaped base body 14 and greater than inner radius RZI of groove 13 to be produced. An outer milling radius (not shown in FIG. 1), defined by outer edges 17 of the cutting bodies, is thus greater than an outer radius of groove 13 to be produced.

In relation to base body 14, cutting bodies 15 are angled to one side, one outer surface 18 of cutting bodies 15 and one disk-shaped or plate-shaped surface 19 of base body 14 and defined by base body 14 enclosing an angle PHI which is smaller than 90° and greater than 0°. Angle PHI is preferably in a range between 5° and 65°, particularly preferably in a range between 5° and 35°.

Due to the angled position of cutting bodies 15 in relation to base body 14 of milling tool 10 and milling inner radius RKI enlarged in relation to inner radius RZI of groove 13 to be produced, milling tool 10 is set at an angle in relation to workpiece 11 to be machined for milling groove 13. A rotation axis 20 of milling tool 10 and surface 12 of workpiece 11 to be machined in turn enclose an angle BETA, which corresponds approximately to or is equal to angle PHI.

FIG. 2 clarifies groove 13 produced using the above-described milling tool 10 according to the present invention. The angular position of milling tool 10 in relation to workpiece 11 to be machined results in parabolically shaped cutting edges in the area of groove 13. Therefore, FIG. 2 shows a parabolically shaped inner wall 21 and a parabolically shaped outer wall 22 of circular groove 13 to be produced. Furthermore, FIG. 2 shows a tolerance TOLI between milled inner wall 21 and the design form of same as well as a tolerance TOLA between milled outer wall 22 of groove 13 and the corresponding design form. The sum of TOLI and TOLA results in the total tolerance of groove 13 to be produced.

Outer tolerance TOLA may be decreased by increasing inner tolerance TOLI; however, it must be pointed out that due to the geometric conditions an increase in inner tolerance TOLI does not cause a decrease in outer tolerance TOLA to the same extent or to the same degree. Therefore, an increase in the inner tolerance also results in an increase in the total tolerance in any event.

The procedure for milling a groove 13 using milling tool 10 according to the present invention is that a workpiece 11 is provided and inner radius RZI of groove 13 to be milled and depth TN as well as width DN of groove 13 to be milled are preferably established for workpiece 11. As previously mentioned, width DN of groove 13 determines thickness DS of cutting bodies 15 of milling tool 10 according to the present invention. In addition to inner radius RZI, depth TN, and width DN of groove 13, permissible inner tolerance TOLI and permissible outer tolerance TOLA are established for groove 13. Radius RKI and angle PHI are subsequently determined or calculated from these values. This takes place preferably automatically by using appropriate software which ascertains parameters DS, PHI, and RKI using RZI, DN, TN, as well as TOLI and TOLA specifications. It should be noted at this point that for a predefined inner tolerance TOLI, outer tolerance TOLA may be calculated from thickness DS of cutting bodies 15 and parameters RKI and PHI. It is thus also sufficient to only predefine inner tolerance TOLI as the tolerance value.

It is therefore the object of the present invention to not use an end mill for milling narrow, circular grooves in particular, as is customary in the related art, but rather use a milling tool which has a plate-shaped or disk-shaped base body and cutting bodies situated on the outer periphery of the base body. The cutting bodies are angled in relation to the base body. A milling radius, in particular an inner milling radius defined by the cutting bodies, is greater than the radius, in particular the inner radius, of the recess to be milled. During milling, the milling tool is inclined in relation to the surface into which the groove is to be milled by the angle at which the cutting bodies are angled in relation to the plate-shaped base body.

By using the milling tool and the method according to the present invention for milling circular recesses, a high metal-cutting capacity may be achieved even in the case of narrow grooves, because the milling tool according to the present invention is clearly less susceptible to mechanical stresses than end mills. The milling tool according to the present invention is characterized by a robust operability. Carbide teeth or ceramic tips may be used as cutting bodies. The tool costs for the milling tool according to the present invention are low.

FIG. 3 shows a preferred exemplary embodiment of a milling tool, the same reference numerals being used for the same assemblies in order to avoid unnecessary repeats. Milling tool 10 according to FIG. 3 has a plate-shaped or disk-shaped base body 14 and cutting bodies 15 angled in relation to base body 14. In the exemplary embodiment of FIG. 3, angle PHI, at which cutting bodies 15 are angled to one side in relation to surface 19, is approximately 10°.

The method according to the present invention is particularly suitable for milling narrow circular grooves. It is particularly advantageously usable in the finishing or reconditioning of grooves in gas turbine components which have been deformed during operation, i.e., a groove to be machined is no longer circular but oval or polygonal. This may also be carried out using the milling cutter according to the present invention by initially measuring the groove which was deformed during operation and, as a function thereof, influencing the milling tool in the sense of an adaptive milling method for machining the groove. Angle PHI is adapted here in particular.

Moreover, it is the object of the present invention to use the milling tool according to the present invention and the method according to the present invention for milling operations on integrally bladed rotors which are also referred to as blisk or bling rotors. The method is particularly suitable for milling blade profiles on blisks and blings in a simplified manner. Using the method according to the present invention, flow channels on blisks or blings between adjacent blades may be cut out quickly and with high metal-cutting capacity. Such a milling operation on blisks or blings may take place as rough machining or as finishing. A five-axle milling machine is preferably used for finishing, with the help of which the milling tool may be guided to any point of a profile to be milled with position accuracy.

The milling tool and the method according to the present invention are also suitable for manufacturing single blades which will be described in the following with reference to FIG. 4. FIG. 1 shows a milling tool 10 according to the present invention, using which, according to FIG. 4, a suction side 23 of a single blade 24 is cut out. Milling tool 10 in FIG. 4 corresponds in principle to milling tool 10 in FIG. 1 so that the same reference numerals are used for the same assemblies to avoid repeats. Milling tool 10 is rotationally driven in the direction of arrow 25. During milling, milling tool 10 continues to be moved into the material in the direction of the rotation axis. During milling of suction side 23 of single blade 24, inner edge 16 of milling tool 10 must be adapted accordingly to the contour of suction side 23. If a discharge side 26 of single blade 24 is to be cut out opposite suction side 23, either outer edge 17 of same milling tool 10 may be used as a function of the curvature difference between suction side 23 and discharge side 26, or the milling tool is exchanged. Rough machining or finishing are also possible here on single blade 24. The milling operation on blisks or blings may be carried out similarly to the exemplary embodiment according to FIG. 4; in this case milling tool 10 must be designed in such a way that in no position of the milling tool can a collision occur with the blade contours of the blisk or bling.

What is claimed is:

1. A method for milling circular recesses into a workpiece, comprising:
   providing a milling tool, the milling tool including a base body and at least one cutting body having inside and outside surfaces with respect to the circular recess and situated on an outer periphery of the base body, the inside and outside surfaces of the at least one cutting body being angled away from the base body such that the at least one cutting body is angled away from a rotation axis of the milling tool, the base body being disk shaped or plate shaped, and wherein an inside radius of the inside surface of the at least one cutting body is greater than a radius of an inside surface of the circular recess; and
   milling recesses into a workpiece with the milling tool;
   wherein during milling, the rotation axis of the milling tool and a surface of the workpiece into which a circular recess is milled define a first acute angle, the surface of the workpiece into which the circular recess is milled being planar.

2. The method as recited in claim 1, wherein the first acute angle corresponds approximately to a second acute angle between the outside surface of the at least one cutting body and a disk-shaped or plate-shaped surface of the base body.

3. The method as recited in claim 1, further comprising:
   calculating a suitable milling radius and a suitable angle between an outside of the cutting body of the milling tool and the disk-shaped or plate-shaped surface of the base body of the milling tool based on: a radius, a depth and a width of the circular recess to be milled; and a permissible tolerance for the recess.

4. The method as recited in claim 3, wherein the tolerance includes a tolerance for a circular inner wall and/or a tolerance for a circular outer wall of the circular recess to be milled.

5. The method of claim 1, wherein the work piece is a gas turbine component.

6. The method of claim 1, wherein the milling step comprises reconditioning groove-shaped recesses on gas turbine components which are deformed.

* * * * *